(12) United States Patent
Suzuki (10) Patent No.: US 11,481,157 B2
(45) Date of Patent: Oct. 25, 2022

(54) ELECTRONIC APPARATUS AND TRANSFER METHOD

(71) Applicant: Kioxia Corporation, Tokyo (JP)

(72) Inventor: Tomoaki Suzuki, Chigasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/201,346

(22) Filed: Mar. 15, 2021

(65) Prior Publication Data

US 2022/0083270 A1 Mar. 17, 2022

(30) Foreign Application Priority Data

Sep. 17, 2020 (JP) .............................. JP2020-156371

(51) Int. Cl.
*G06F 3/06* (2006.01)

(52) U.S. Cl.
CPC .......... *G06F 3/0659* (2013.01); *G06F 3/0611* (2013.01); *G06F 3/0638* (2013.01); *G06F 3/0679* (2013.01)

(58) Field of Classification Search
CPC ...... G06F 3/0659; G06F 3/0611; G06F 3/063; G06F 3/0679
See application file for complete search history.

(56) References Cited

U.S. PATENT DOCUMENTS

| | | | |
|---|---|---|---|
| 7,818,479 B2 | 10/2010 | Takeuchi et al. | |
| 8,832,333 B2 | 9/2014 | Morita | |
| 9,389,805 B2 | 7/2016 | Cohen et al. | |
| 2011/0010511 A1* | 1/2011 | Kinoshita | G06F 12/0607 711/E12.001 |
| 2013/0297894 A1 | 11/2013 | Cohen et al. | |
| 2018/0136878 A1* | 5/2018 | Madpur | G11C 7/1039 |
| 2022/0011974 A1* | 1/2022 | Lee | G06F 13/1668 |

FOREIGN PATENT DOCUMENTS

| | | |
|---|---|---|
| JP | 2010-092493 A | 4/2010 |
| JP | 2012-128644 A | 7/2012 |
| JP | 2014-522066 A | 8/2014 |

OTHER PUBLICATIONS

Ou, Yang, Nong Xiao, and Mingche Lai. "A scalable multi-channel parallel NAND flash memory controller architecture." 2011 Sixth Annual Chinagrid Conference. IEEE, 2011. (Year: 2011).*

* cited by examiner

*Primary Examiner* — Kalpit Parikh
(74) *Attorney, Agent, or Firm* — Oblon, McClelland, Maier & Neustadt, L.L.P.

(57) ABSTRACT

According to one embodiment, an electronic apparatus includes an interface circuit connectable to a first signal line, a second signal line, and a third signal line, and a controller. Before transmitting data using the first signal line, the controller is configured to transmit a first command using the first signal line while transmitting a first control signal using the second signal line, and transmit a first address using the first signal line while transmitting a second control signal using the third signal line. While transmitting the data using the first signal line, the controller is configured to transmit at least one of a second command and a second address using the second signal line and the third signal line.

18 Claims, 9 Drawing Sheets

ELECTRONIC APPARATUS AND TRANSFER METHOD

CROSS-REFERENCE TO RELATED APPLICATIONS

This application is based upon and claims the benefit of priority from Japanese Patent Application No. 2020-156371, filed Sep. 17, 2020, the entire contents of which are incorporated herein by reference.

FIELD

Embodiments described herein relate generally to an electronic apparatus that transfers data and a transfer method.

BACKGROUND

An example of a storage device includes a solid-state drive (SSD). The SSD includes a nonvolatile memory (for example, NAND flash memory) and a memory controller. The toggle interface is used as an interface between the memory controller and the nonvolatile memory.

In the toggle interface, a command (and an address), and data are transferred by an I/O signal line. The I/O signal line is shared for command (and address) transfer and data transfer. Therefore, it is not possible to transfer the command (and the address) between the memory controller and the nonvolatile memory during the data transfer. Similarly, it is not possible to transfer the data during the command (and the address) transfer.

When a host transmits a read request or a write request to the SSD during the data transfer, issuing of a command from the memory controller to the nonvolatile memory is delayed until the data transfer is completed. A performance of the SSD is lowered by the latency.

DETAILED DESCRIPTION

Hereinafter, an embodiment will be described with reference to the drawings. The following descriptions are provided to exemplify a device and a method for embodying the technical idea of the embodiment. The technical idea of the embodiment is not limited to a structure, shapes, arrangement, materials, and the like of components described below. Modifications easily conceivable by those skilled in the art are naturally included in the scope of the disclosure. In order to make the descriptions clearer, in the drawings, each element may be schematically expressed by changing the size, the thickness, the planar dimension, the shape, or the like of the element from that in an actual embodiment. In drawings, elements having different dimensional relations and different ratios may be included. In the drawings, corresponding elements may be denoted by the same reference signs, and repetitive descriptions may be omitted. Although different names may be given to some elements, the names are merely examples, and other names may be given to the elements. Other names are given to elements to which a single name is given. In the following description, "connection" means not only a direct connection, but also an indirect connection through another element.

In general, according to one embodiment, an electronic apparatus includes an interface circuit connectable to a first signal line, a second signal line, and a third signal line; and a controller configured to transmit a first command, a first address, data, and one of a second address and a second address via the interface circuit. Before transmitting the data using the first signal line, the controller is configured to transmit the first command using the first signal line while transmitting a first control signal using the second signal line, and transmit the first address using the first signal line while transmitting a second control signal using the third signal line. While transmitting the data using the first signal line, the controller is configured to transmit at least one of the second command and the second address using the second signal line and the third signal line.

Figure 1:
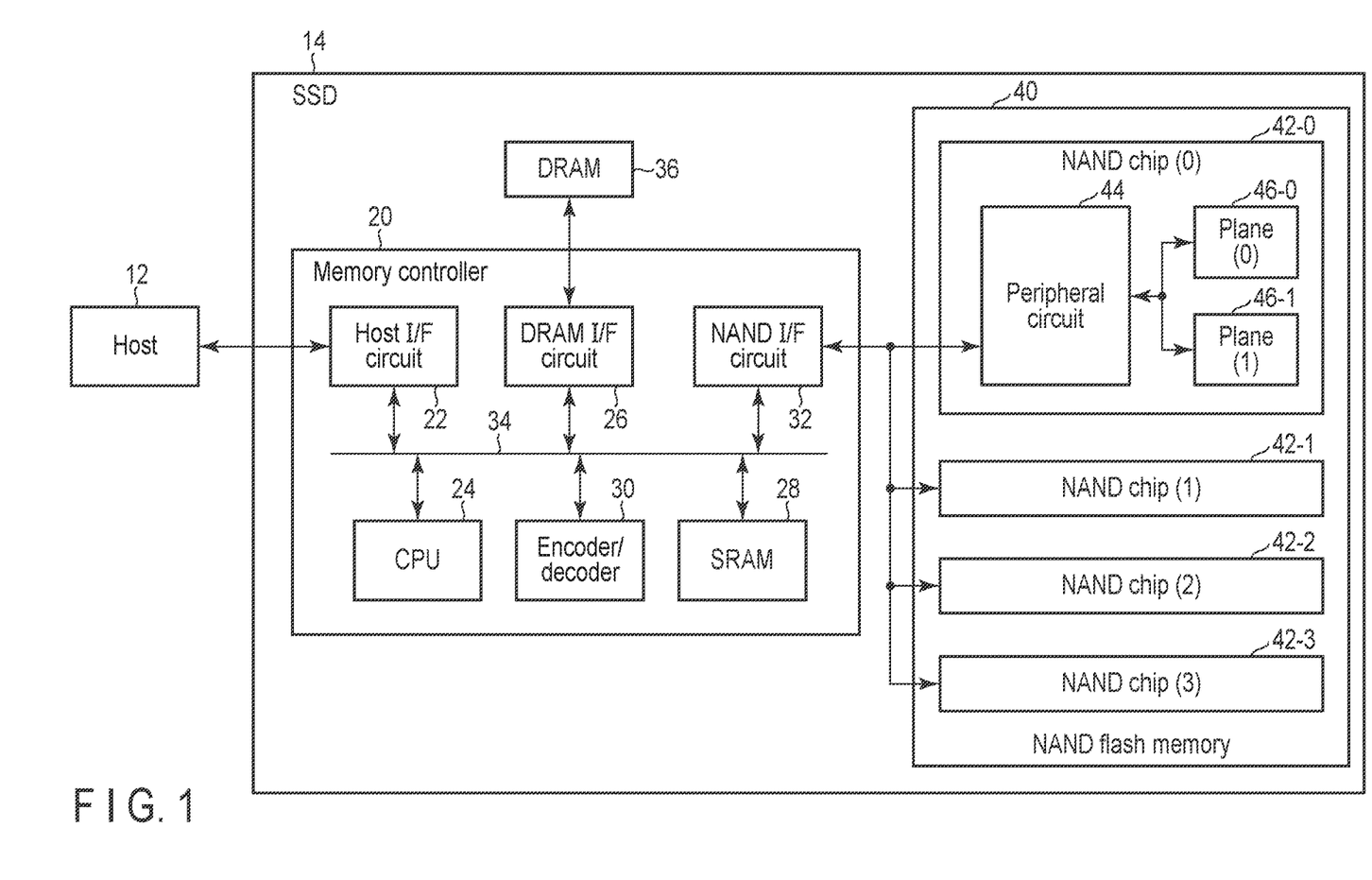
FIG. 1 is a diagram illustrating an example of a configuration of a memory system including an electronic apparatus according to a first embodiment.

FIG. 1 is a diagram illustrating an example of a configuration of a memory system including an electronic apparatus according to a first embodiment. The memory system includes a host 12 and an SSD 14.

The host 12 is an information processing device configured to control the SSD 14. Examples of the host 12 include a personal computer, a server computer, a portable terminal, and an onboard device.

The SSD 14 may be connected to the host 12 by a cable or via a network, or may be built in the host 12. The SSD 14 is a semiconductor storage device including a memory controller 20 and a nonvolatile memory 40.

An example of the nonvolatile memory 40 may be a NAND flash memory (referred to as a NAND memory hereinafter). The nonvolatile memory 40 is not limited to the NAND memory. A NOR flash memory or other types of nonvolatile memories may be used. The NAND memory 40 may have a two-dimensional structure or a three-dimensional structure.

The NAND memory 40 includes a plurality of NAND chips. For example, the NAND memory 40 includes four NAND chips being a NAND chip (0) 42-0, a NAND chip (1) 42-1, a NAND chip (2) 42-2, and a NAND chip (3) 42-3. The NAND chips 42-0 to 42-3 are collectively referred to as a NAND chip 42 when it is not necessary to distinguish the NAND chips 42-0 to 42-3 from each other. Each of the NAND chips 42 includes a peripheral circuit 44 and a plurality of planes. For example, each of the NAND chips 42 includes two planes being a plane (0) 46-0 and a plane (1) 46-1. The planes 46-0 and 46-1 are collectively referred to as a plane 46 when it is not necessary to distinguish the planes 46-0 and 46-1 from each other.

The SSD 14 may further include a random access memory, for example, a dynamic random access memory (DRAM) 36. The DRAM 36 functions as a buffer for data transfer between the host 12 and the NAND memory 40. A portion of a storage area of the DRAM 36 may be used as a write buffer, a read buffer, and a command buffer. The write buffer temporarily stores data to be written to the NAND memory 40. The read buffer temporarily stores data read from the NAND memory 40. The command buffer temporarily stores a command received from the host 12 until the command is executed.

The memory controller 20 may be realized by a circuit such as a system on a chip (SoC). The memory controller 20 includes a NAND interface (NAND I/F) circuit 32 that is electrically connected to the NAND memory 40. The NAND I/F circuit 32 is a controller configured to control the NAND memory 40 under the control of a CPU 24. Therefore, the NAND I/F circuit 32 may also be referred to as a NAND controller. An example of the NAND I/F circuit 32 include a toggle interface.

Connection between the NAND I/F circuit 32 and the NAND memory 40 is called "channel". The NAND I/F circuit may be connected to the NAND memory 40 via a single channel or plural channels. The NAND memory 40 may include a single NAND chip or plural NAND chips. In the embodiment of FIG. 1, the NAND I/F circuit 32 includes two channels. The NAND chips 42-0 and 42-1 are connected to a first channel. The NAND chips 42-2 and 42-3 are connected to a second channel.

The memory controller 20 may function as a flash translation layer (FTL) configured to perform data management and block management of the NAND memory 40. The data management performed by the FTL includes: (1) management of mapping information indicative of the correspondence relation between a logical address and a physical address of the NAND memory 40; and (2) processing of hiding constraints (for example, read/write operation in units of pages and erase operation in units of blocks) of the NAND memory 40.

In addition to the NAND I/F circuit 32 described above, the memory controller 20 includes a host interface (host I/F) circuit 22, a DRAM interface (DRAM I/F) circuit 26, a static RAM (SRAM) 28, and an encoder/decoder 30. The host I/F circuit 22, the CPU 24, the NAND I/F circuit 32, the DRAM I/F circuit 26, the SRAM 28, and the encoder/decoder 30 are connected to each other via a bus 34. The memory controller 20 may be an integrated circuit in which the above-described components are mounted. Some of the above components may be provided outside the memory controller 20.

The host I/F circuit 22 performs communication with the host 12. Examples of the host I/F circuit 22 include serial ATA (SATA), serial attached SCSI (SAS), PCI Express (PCIe)™, and Ethernet™. The host I/F circuit 22 receives various commands and various data such as a write command, write data, and a read command from the host 12. The write command includes a logical address (starting logical address) and the size of write data. The write command instructs the SSD 14 to write the write data to the storage area of the NAND memory 40, which corresponds to the starting logical address and the size. The read command includes a logical address (starting logical address) and the size of data to be read. The read command instructs the SSD 14 to read the data from the storage area of the NAND memory 40, which corresponds to the starting logical address and the size.

The DRAM I/F circuit 26 is an interface circuit configured to control the DRAM 36 under the control of the CPU 24. The DRAM I/F circuit 26 may also be referred to as a DRAM controller.

The encoder/decoder 30 encodes and decodes data for error detection and error correction in read data. The encoder/decoder 30 encodes write data to be written to the NAND memory 40. The encoder/decoder 30 decodes read data read from the NAND memory 40. In decoding, the encoder/decoder 30 performs error detection and error correction in the read data.

The CPU 24 is a processor configured to control the host I/F circuit 22, the NAND I/F circuit 32, the DRAM I/F circuit 26, the SRAM 28, and the encoder/decoder 30. In response to the power-on of the SSD 14, the CPU 24 loads a control program (referred to as firmware) from the NAND memory 40 or a ROM (not illustrated) into the DRAM 36, and executes the firmware to execute various processes.

Figure 2:
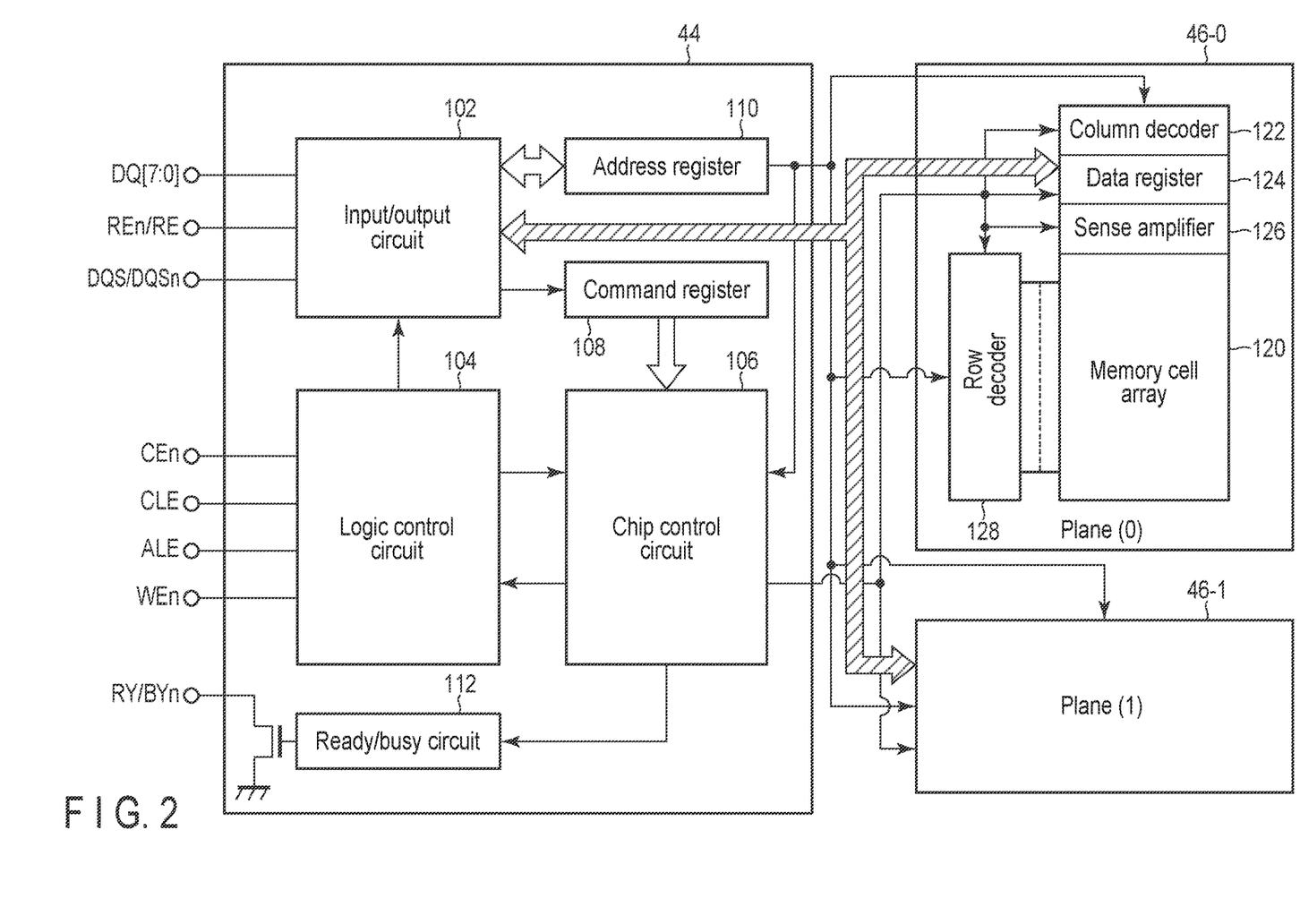
FIG. 2 is a diagram illustrating an example of a configuration of a NAND chip.

FIG. 2 illustrates an example of the configuration of each of the NAND chips 42. The peripheral circuit 44 in the NAND chip 42 includes an input/output circuit 102, a logic control circuit 104, a chip control circuit 106, a command register 108, an address register 110, and a ready/busy circuit 112. Each of the planes 46 in the NAND chip 42 includes a memory cell array 120, a column decoder 122, a data register 124, a sense amplifier 126, and a row decoder 128.

The channel CH connecting the NAND chip 42 and the NAND I/F circuit 32 to each other includes I/O signal lines DQ [7:0] for transferring I/O signals and control signal lines for transferring control signals. The I/O signals include a command, an addresses, and data. The I/O signal lines DQ [7:0] are connected to the input/output circuit 102.

The control signal lines include a chip enable signal line CEn, a command latch enable signal line CLE, an address latch enable signal line ALE, a write enable signal line WEn, a read enable signal line REn/RE, a data strobe signal line DQS/DQSn, and a ready/busy signal line RY/BYn. A 1-bit control signal is transferred in each of the control signal lines. The command, the address, and the data are transferred in the I/O signal lines DQ [7:0]. The command latch enable signal line CLE transfers a command latch enable signal. The command latch enable signal indicates that the signals transferred by the I/O signal lines DQ [7:0] form a command. The address latch enable signal line ALE transfers an address latch enable signal. The address latch enable signal indicates that the signals transferred by the I/O signal lines DQ [7:0] form an address. The chip enable signal line CEn, the command latch enable signal line CLE, the address latch enable signal line ALE, and the write enable signal line WEn are connected to the logic control circuit 104. The read enable signal line REn/RE and the data strobe signal line DQS/DQSn are connected to the input/output circuit 102. The ready/busy signal line RY/BYn is connected to the ready/busy circuit 112.

The signal transferred in the signal line includes a high active signal (positive logic signal) that is active (valid) at a high level or a low active signal (negative logic signal) that is active at a low level. Normally, a negative logic signal is represented by adding an overline or an upper line to a symbol representing the signal. In this specification, for convenience of notation, the negative logic signal is represented by adding n after the symbol. For example, the chip enable signal line CEn means transferring of a negative logic signal that has a low level when the NAND chip 42 is enabled and has a high level when the NAND chip is disabled. When the signal is at the valid level, the signal line is referred to as being "asserted". When the signal is at the invalid level, the signal line is referred to as being "deasserted". When the signal line for transferring the positive logic signal is asserted, a signal level becomes the high level. When the signal line for transferring the negative logic signal is asserted, the signal level becomes the low level.

Normally, the signal line is used for transferring a signal of either the positive logic or the negative logic, but the read enable signal line REn/RE and the data strobe signal line DQS/DQSn are used for transferring complementary signals of both logics.

The I/O signal lines DQ [7:0] are 8-bit signal lines for transferring data, an address, and various commands. The NAND I/F circuit 32 asserts the command latch enable signal line CLE when transferring a command by the I/O signal lines DQ [7:0]. The NAND I/F circuit 32 asserts the address latch enable signal line ALE when transferring an address by the I/O signal lines DQ [7:0]. The NAND I/F circuit 32 transfers a command and an address by the I/O signal lines DQ [7:0] in synchronization with the rising edge of the write enable signal line WEn.

The NAND I/F circuit 32 transfers write data by the I/O signal lines DQ [7:0] in synchronization with both of the rising edge and the falling edge of the data strobe signal line DQS/DQSn. The peripheral circuit 44 transfers read data by the I/O signal lines DQ [7:0] in synchronization with both of the rising edge and the falling edge of the data strobe signal line DQS/DQSn.

The chip control circuit 106 causes a state transition based on various control signals received through the logic control circuit 104. The chip control circuit 106 controls the operation of the NAND chip 42. The ready/busy circuit 112 transitions the state of the ready/busy signal line RY/BYn to a state between the ready state (RY) and the busy state (BY), under the control of the chip control circuit 106.

The input/output circuit 102 is a buffer circuit configured to transmit and receive the I/O signals to and from the NAND I/F circuit 32. A command, an address, and data latched by the input/output circuit 102 based on an instruction from the logic control circuit 104 are stored in the command register 108, the address register 110, and the data register 124, respectively.

The address stored in the address register 110 includes a chip number, a row address, and a column address. The chip number is identification information for identifying the NAND chips 42. The chip number is supplied to the chip control circuit 106. The row address is supplied to the row decoder 128. The column address is supplied to the column decoder 122. The address may also include a plane number for identifying the plane. When the address does not include the plane number, an address space may be divided into sub-spaces of respective planes so that the address can identify the plane. Similarly, the address may not include the chip number. In this case, the address space may be divided into sub-spaces of respective chips so that the address can identify the chip.

The logic control circuit 104 receives an input of the control signal. The logic control circuit 104 determines a register to which the I/O signal received by the input/output circuit 102 is stored based on the received control signal. The logic control circuit 104 transfers the received control signal to the chip control circuit 106.

The memory cell array 120 in each of the planes 46 of the NAND chip 42 includes a plurality of blocks. Each of the block includes a plurality of pages. Each of the pages includes a plurality of memory cells connected to the same word line. The block is a unit of a data erase operation (also referred to as block erase) of erasing data from the NAND memory 40. The page is a unit of a data write operation and a data read operation.

The column decoder 122 and the row decoder 128 specify the memory cell of the memory cell array 120 in accordance with the column address and the row address. During the write operation, data in the data register 124 is written to a memory cell specified by the column decoder 122 and the row decoder 128. During the read operation, the sense amplifier 126 reads data from a memory cell specified by the column decoder 122 and the row decoder 128. The read data is written to the data register 124.

Next, the outline of the toggle interface between the memory controller 20 (NAND I/F circuit 32) and the NAND memory 40 (peripheral circuit 44) will be described.

Figure 3:
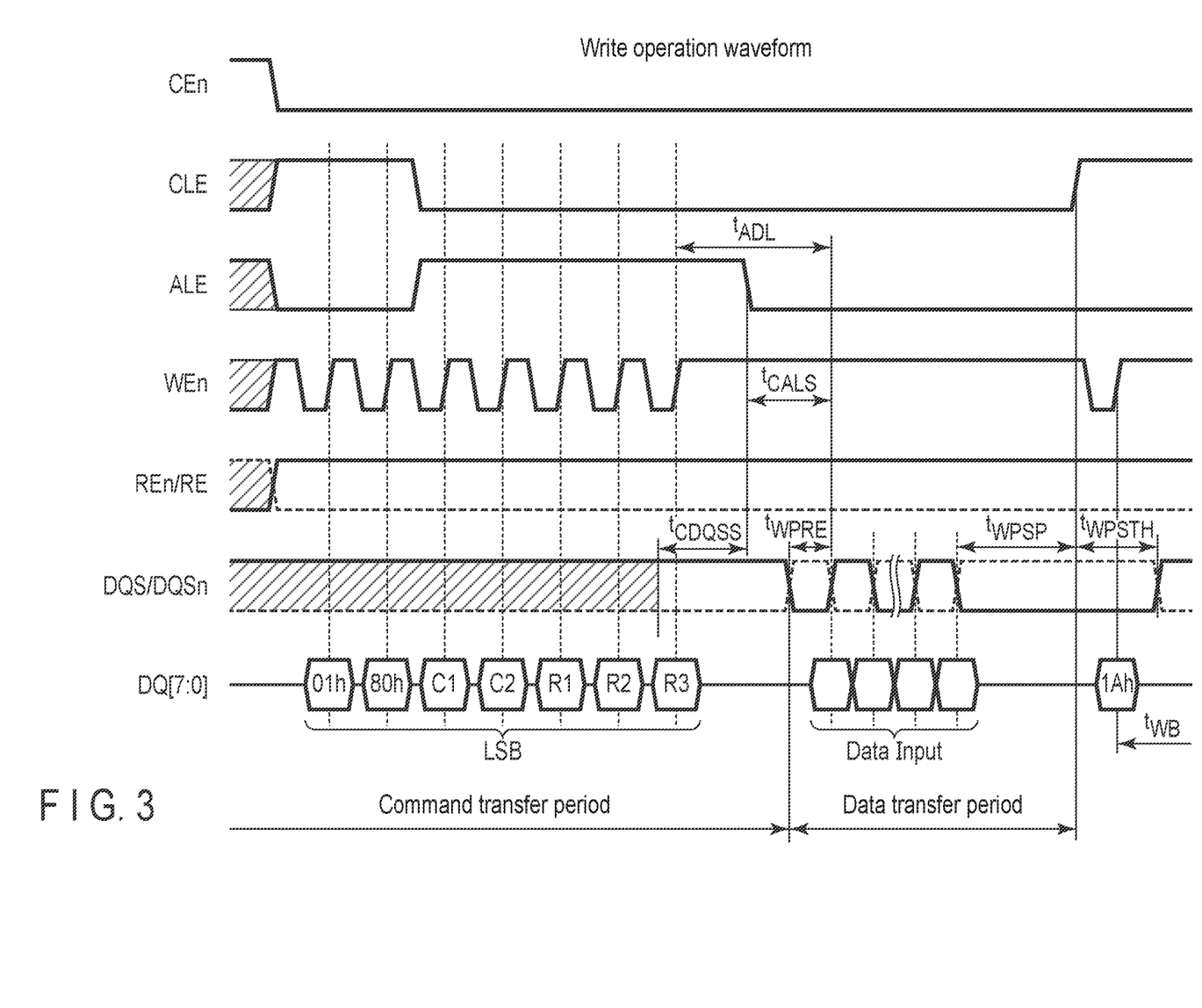
FIG. 3 is a diagram illustrating an example of signal waveforms indicative of a write operation.

FIG. 3 illustrates an example of signal waveforms during the write operation. In an initial state, the chip enable signal line CEn is in a deasserted state, the data strobe signal line DQS/DQSn is in a high impedance (Hi-z) state, and the states of other signal lines are disregarded. The diagonal lines in FIG. 3 indicate that the state of the signal line is disregarded.

The NAND I/F circuit 32 asserts the chip enable signal line CEn and the command latch enable signal line CLE, and deasserts the address latch enable signal line ALE, the write enable signal line WEn, and the read enable signal line REn/RE. The NAND I/F circuit 32 starts periodic asserting/deasserting of the write enable signal line WEn. That is, the level of the write enable signal line WEn periodically becomes the low level and the high level. The NAND I/F circuit 32 sequentially transfers commands 01$h$ and 80$h$ to the NAND chip 42 by the I/O signal lines DQ [7:0] in synchronization with the rising edge (deasserting) of the write enable signal line WEn. The input/output circuit 102 in the NAND chip 42 sequentially latches the commands 01$h$ and 80$h$ which are sequentially input by the I/O signal lines DQ [7:0], in synchronization with the rising edge of the write enable signal line WEn.

The write mode of the NAND memory 40 is classified into several write modes in accordance with how many bits of data can be written to a memory cell. Examples of the write mode include a Single Level Cell (SLC) write mode in which 1-bit data can be written to a memory cell, a Multi Level Cell (MLC) write mode in which 2-bit data can be written to a memory cell, a Triple Level Cell (TLC) write mode in which 3-bit data can be written to a memory cell, and a Quad Level Cell (QLC) write mode in which 4-bit data can be written to a memory cell.

Here, it is assumed that the write mode of the NAND memory 40 is the TLC write mode. Lower page data, middle page data, and upper page data, which are data for three pages, are written to a plurality of memory cells connected to the same word line. Since only data for one page is written in one write operation, the commands 01$h$ and 80$h$ are write commands for writing the data of the lower page.

After transferring the command 80$h$, the NAND I/F circuit 32 deasserts the command latch enable signal line CLE and asserts the address latch enable signal line ALE.

The NAND I/F circuit 32 sequentially transfers column addresses C1 and C2 of two cycles and row addresses R1, R2, and R3 of three cycles to the NAND chip 42 by the I/O signal lines DQ [7:0] in synchronization with the rising edge of the write enable signal line WEn. The input/output circuit 102 sequentially latches the column addresses and the row addresses which are sequentially input by the I/O signal lines DQ [7:0], in synchronization with the rising edge of the write enable signal line WEn.

After transferring the row address R3, the NAND I/F circuit 32 maintains the deasserted state of the write enable signal line WEn to stop the periodic asserting/deasserting of the write enable signal line WEn.

The NAND I/F circuit 32 deasserts the address latch enable signal line ALE after $t_{CDQSS}$ from the start of transfer of row address R3.

The NAND I/F circuit 32 starts periodic deasserting/asserting of the data strobe signal line DQS/DQSn. The NAND I/F circuit 32 sequentially transfers write data to the NAND chip 42 by the I/O signal lines DQ [7:0] in synchronization with both of the rising edge and the falling edge of the data strobe signal line DQS/DQSn. The input/output circuit 102 sequentially latches the write data which is sequentially input by the I/O signal lines DQ [7:0], in synchronization with both of the rising edge and the falling edge of the data strobe signal line DQS/DQSn, and stores the write data therein.

After the transfer of the write data is completed, the NAND I/F circuit 32 stops the periodic deasserting/asserting of the data strobe signal line DQS/DQSn.

The NAND I/F circuit 32 asserts the command latch enable signal line CLE and asserts/deasserts the write enable signal line WEn for only one cycle. The NAND I/F circuit 32 transfers a command 1Ah to the NAND chip 42 by the I/O signal lines DQ [7:0] in synchronization with the rising edge (deasserting) of the write enable signal line WEn. The command 1Ah is indicative of the end of the write operation and the start of transferring data latched in the input/output circuit 102 to the data register 124. The input/output circuit 102 latches the command 1Ah input by the I/O signal lines DQ [7:0], in synchronization with the rising edge of the write enable signal line WEn.

Figure 4:
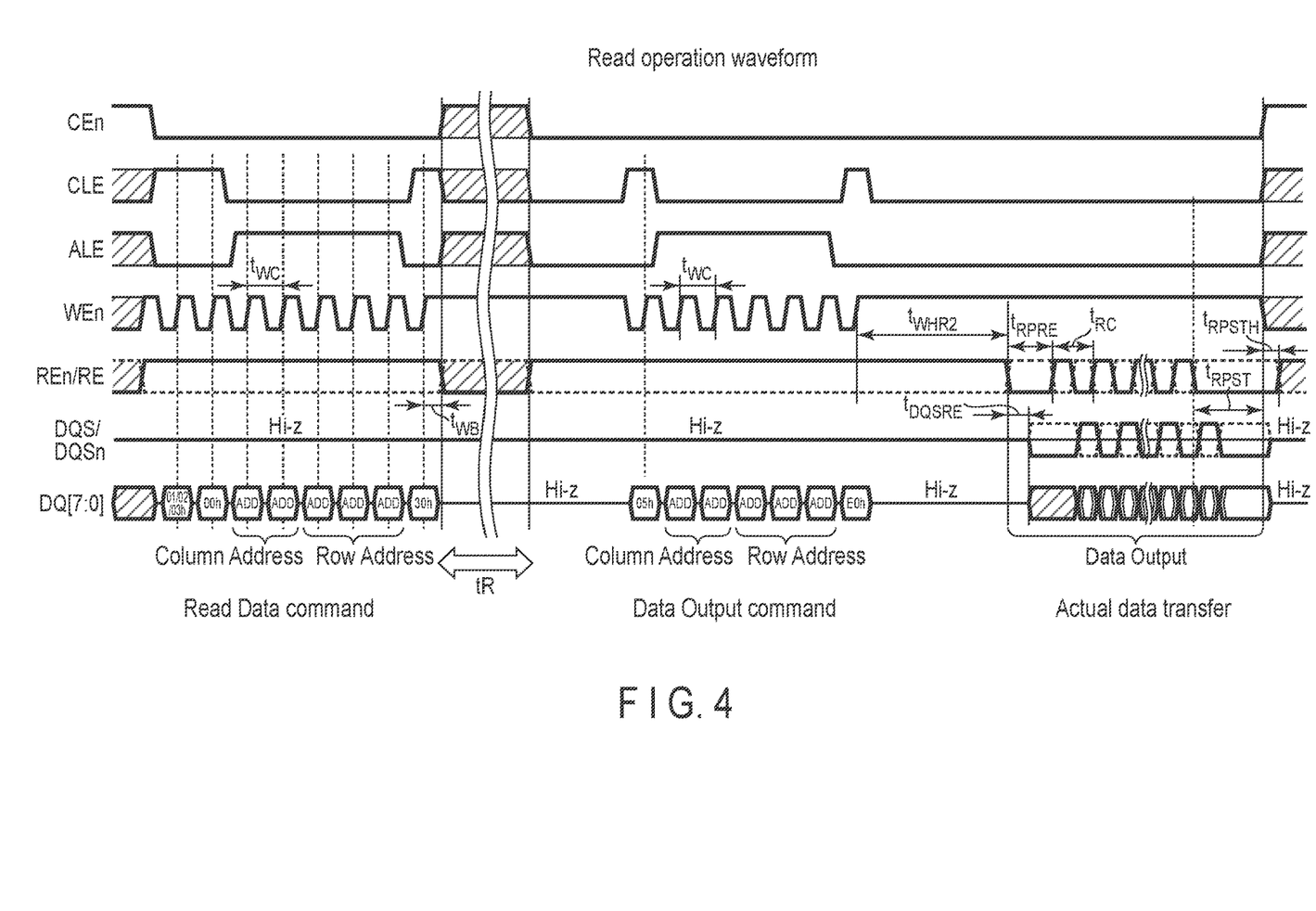
FIG. 4 is a diagram illustrating an example of signal waveforms indicative of a read operation.

FIG. 4 illustrates an example of signal waveforms during the read operation where the write mode of the NAND memory 40 is the TLC write mode. The read operation includes a data output preparation operation and a data output operation. In the data output preparation operation, data is read from a memory cell specified by the address following the read data command, and the read data is written to the data register 124 in the NAND chip 42. In the data output operation, the data in the data register 124 is transferred to the memory controller 20 by the input/output circuit 102.

In the initial state, the chip enable signal line CEn is in the deasserted state, the data strobe signal line DQS/DQSn is in the high impedance (Hi-z) state, and the states of other signal lines are disregarded. The diagonal lines in FIG. 4 indicate that the state of the signal line is disregarded.

The NAND I/F circuit 32 asserts the chip enable signal line CEn and the command latch enable signal line CLE, deasserts the address latch enable signal line ALE, the write enable signal line WEn/WE, and the read enable signal line REn/RE, and maintains the high impedance state of the data strobe signal line DQS/DQSn.

The NAND I/F circuit 32 starts periodic asserting/deasserting of the write enable signal line WEn. That is, the level of the write enable signal line WEn periodically becomes the low level and the high level. The NAND I/F circuit 32 sequentially transfers commands 01h/02h/03h and 00h indicative of the read data command to the NAND chip 42 by the I/O signal lines DQ [7:0] in synchronization with the rising edge (deasserting) of the write enable signal line WEn. The input/output circuit 102 sequentially latches the commands 01h/02h/03h and 00h which are sequentially input by the I/O signal lines DQ [7:0], in synchronization with the rising edge of the write enable signal line WEn.

The command 01h/02h/03h is indicative of a command for reading a lower page, a middle page, or a higher page. The command 00h indicates that the read address follows.

After transferring the command 00h, the NAND I/F circuit 32 deasserts the command latch enable signal line CLE and asserts the address latch enable signal line ALE.

The NAND I/F circuit 32 sequentially transfers column addresses ADD of two cycles and row addresses ADD of three cycles to the NAND chip 42 by the I/O signal lines DQ [7:0] in synchronization with the rising edge (deasserting) of the write enable signal line WEn. The input/output circuit 102 sequentially latches the column addresses and the row addresses which are sequentially input by the I/O signal lines DQ [7:0], in synchronization with the rising edge of the write enable signal line WEn.

After transferring the row address ADD, the NAND I/F circuit 32 deasserts the address latch enable signal line ALE and asserts the command latch enable signal line CLE.

The NAND I/F circuit 32 transfers a command 30h to the NAND chip 42 by the I/O signal lines DQ [7:0] in synchronization with the rising edge of the write enable signal line WEn. The command 30h instructs the NAND chip 42 of reading data from a memory cell specified by the address which was previously input.

The input/output circuit 102 latches the command 30h input by the I/O signal lines DQ [7:0], in synchronization with the rising edge of the write enable signal line WEn.

When receiving the command 30h, the NAND chip 42 starts reading of data from the memory cell array. The time taken to read the data is the time tR in FIG. 4. The time tR may be referred to as a preparation time tR.

After transferring the command 30h, the NAND I/F circuit 32 maintains the states of the signal lines for the preparation time tR.

After the preparation time tR, the NAND I/F circuit 32 asserts the command latch enable signal line CLE and maintains the deasserted state of the address latch enable signal line ALE.

The NAND I/F circuit 32 starts periodic asserting/deasserting of the write enable signal line WEn. The NAND I/F circuit 32 transfers a command 05h indicative of the start of a data output command, to the NAND chip 42 by the I/O signal lines DQ [7:0] in synchronization with the rising edge (deasserting) of the write enable signal line WEn. The input/output circuit 102 latches the command 05h input by the I/O signal lines DQ [7:0], in synchronization with the rising edge of the write enable signal line WEn.

After transferring the command 05h, the NAND I/F circuit 32 deasserts the command latch enable signal line CLE and asserts the address latch enable signal line ALE.

The NAND I/F circuit 32 sequentially transfers column addresses ADD of two cycles and row addresses ADD of three cycles to the NAND chip 42 by the I/O signal lines DQ [7:0], in synchronization with the rising edge of the write enable signal line WEn. The input/output circuit 102 sequentially latches the column addresses and the row addresses which are sequentially input by the I/O signal lines DQ [7:0], in synchronization with the rising edge of the write enable signal line WEn.

The NAND chip 42 start preparation of data transfer.

After transferring the row addresses ADD, the NAND I/F circuit 32 deasserts the address latch enable signal line ALE and asserts the command latch enable signal line CLE. The NAND I/F circuit 32 transfers a command E0h indicative of the start of a data output operation to the NAND chip 42 by the I/O signal lines DQ [7:0] in synchronization with the rising edge of the write enable signal line WEn. The input/ output circuit 102 latches the command E0h input by the I/O signal lines DQ [7:0], in synchronization with the rising edge of the write enable signal line WEn.

When receiving the command E0h, the NAND chip 42 starts preparation of data output.

Then, the NAND I/F circuit 32 deasserts the command latch enable signal line CLE and maintains the deasserted state of the address latch enable signal line ALE. The NAND I/F circuit 32 maintains the deasserted state of the write enable signal line WEn to stop the periodic asserting/deasserting of the write enable signal line WEn.

The transfer direction of the I/O signal lines DQ [7:0] is bidirectional. During the transfer of the command, the transfer direction of the I/O signal lines DQ [7:0] is a direction from the memory controller 20 (NAND I/F circuit 32) to the NAND chip 42 (input/output circuit 102). The NAND I/F circuit 32 drives the I/O signal lines DQ [7:0] to transfer the command, and the input/output circuit 102 receives the command.

After $t_{WHR2}$ from the stop of the periodic asserting/deasserting of the write enable signal line WEn, the NAND I/F circuit 32 deasserts the read enable signal line REn/RE and switches the transfer direction of the I/O signal lines DQ [7:0] to a direction from the NAND chip 42 to the memory controller 20. After $t_{WHR2}$ from the stop of the periodic asserting/deasserting of the write enable signal line Wen, the input/output circuit 102 switches the transfer direction of the I/O signal lines DQ [7:0] to the direction from the NAND chip 42 to the memory controller 20. Then, the input/output circuit 102 may drive the I/O signal lines DQ [7:0] to transfer data, and the NAND I/F circuit 32 may receive the data.

When the switching of the transfer direction of the I/O signal lines DQ [7:0] is completed after $t_{PREP}$ from the start of the switching of the transfer direction, the NAND I/F circuit 32 starts periodic deasserting/asserting of the read enable signal line REn/RE. The input/output circuit 102 starts periodic asserting/deasserting of the data strobe signal line DQS/DQSn in conjunction with the periodic deasserting/asserting of the read enable signal line REn/RE with a delay for a predetermined time $t_{DQSRE}$. Then, the input/output circuit 102 transfers read data to the NAND I/F circuit 32 by the I/O signal lines DQ [7:0] in synchronization with the periodic asserting/deasserting of the data strobe signal line DQS/DQSn. The NAND I/F circuit 32 latches the read data input by the I/O signal lines DQ [7:0], in synchronization with the periodic deasserting/asserting of the data strobe signal line DQS/DQSn.

When the number of the periodic deasserting/asserting of the read enable signal line REn/RE reaches a predetermined number corresponding to the size of the read data, the NAND I/F circuit 32 stops the periodic asserting/deasserting of the read enable signal line REn/RE. Thus, the periodic deasserting/asserting of the data strobe signal line DQS/DQSn is also stopped. The NAND I/F circuit 32 deasserts the command latch enable signal line CLE and sets the data strobe signal line DQS/DQSn and the I/O signal lines DQ [7:0] in the high impedance state.

In the toggle interface, a command and data are transferred by the I/O signal lines DQ [7:0]. Therefore, it is not possible to transfer the command during data transfer. Similarly, it is not possible to transfer the data during command transfer.

When the plurality of NAND chips 42 are connected to each of the channels of the memory controller 20, it is not possible to transfer the command to a NAND chip other than a target NAND chip to which the data is transferred, among the plurality of NAND chips connected to the same channel.

Figure 5:
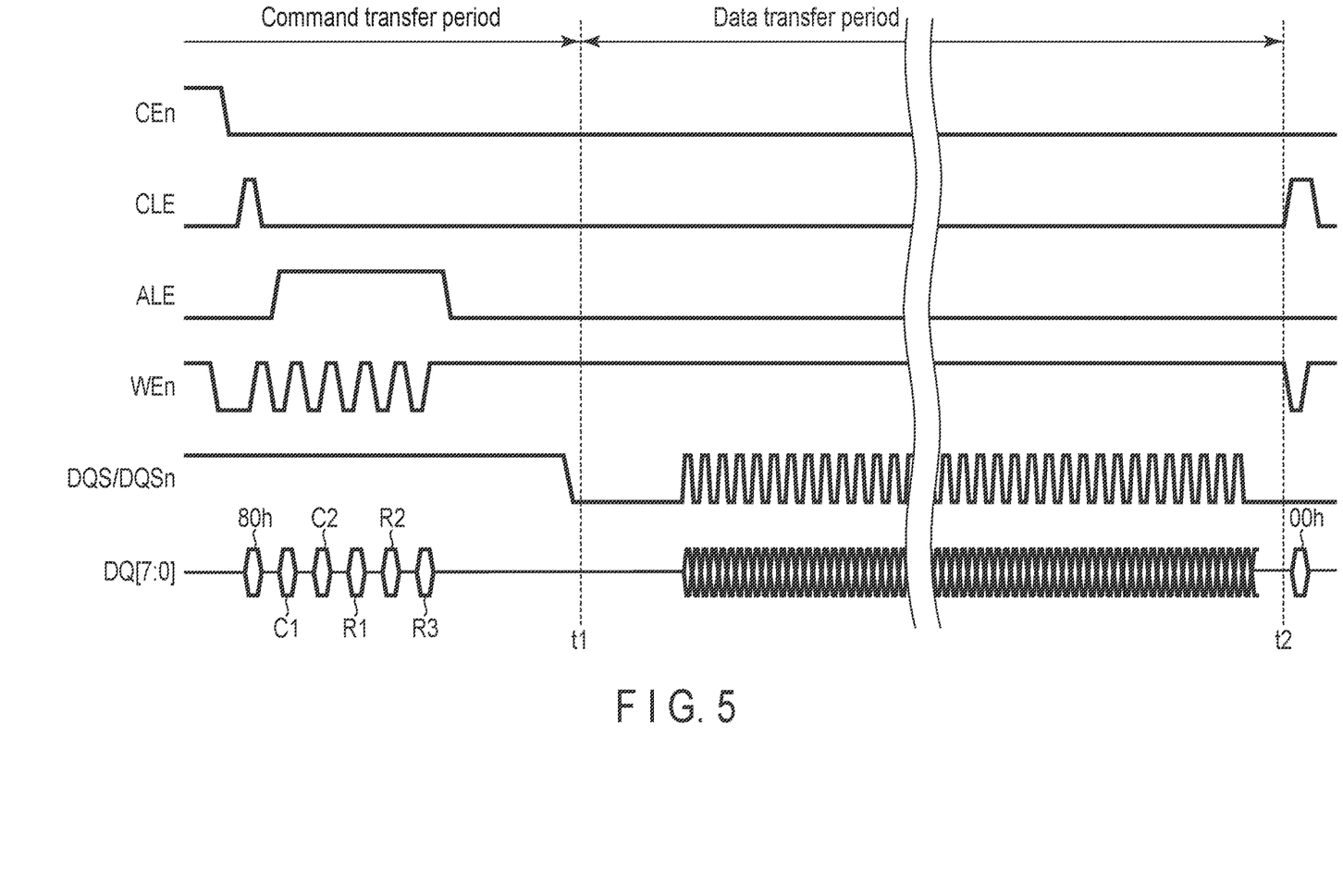
FIG. 5 is a diagram illustrating an example of signal waveforms when a write command and a read data command are sequentially issued.

FIG. 5 illustrates an example of signal waveforms when the write command and the read data command are sequentially issued. The command 01h is not illustrated. FIG. 5 illustrates the signal waveforms between the memory controller 20 and the NAND chip 42-0. It is assumed that a read request is transferred from the host 12 to the SSD 14 at a time point t1 when transfer of the write command from the memory controller 20 to the NAND chip 42-0 is completed. Then, the NAND I/F circuit 32 transfers the write data being the target of the write command, to the NAND chip 42-0 by the I/O signal lines DQ [7:0]. Thus, it is not possible to transfer the read data command, immediately. After a time point t2 when transfer of the write data to the NAND chip 42-0 by the I/O signal lines DQ [7:0] is completed, the NAND I/F circuit 32 can transfer the read data command to the NAND chip 42-0 by the I/O signal lines DQ [7:0].

In the NAND memory 40, reading and writing are performed in page units. Thus, the maximum amount of data that can be transferred after transfer of one command is the size of this page. The size of one page is optional, but may be set to 17,336 bytes by adding ECC to data of 16 kilobytes. A period for the data transfer of the page is a command transfer disabled period.

The command transfer disabled period depends on the data transfer speed of the toggle interface. For example, when the data transfer speed is 4.8 Gbps (4.8 gigabits per second), the command transfer disabled period is 3.96 μs. When the data transfer speed is 2.4 Gbps (2.4 gigabits per second), the command transfer disabled period is 7.57 μs. When the data transfer speed is 1.2 Gbps (1.2 gigabits per second), the command transfer disabled period is 14.80 μs.

As illustrated in FIG. 4, during the read operation, the NAND I/F circuit 32 transfers the read data command. When the read data is stored in the data register 124 and the data output is ready, the NAND I/F circuit 32 transfers the data output command and receives the read data transferred from the input/output circuit 102. The performance of the NAND memory 40 is lowered by the preparation time tR from the completion of the transfer of the read data command to the start of transfer of the data output command.

Figure 6:
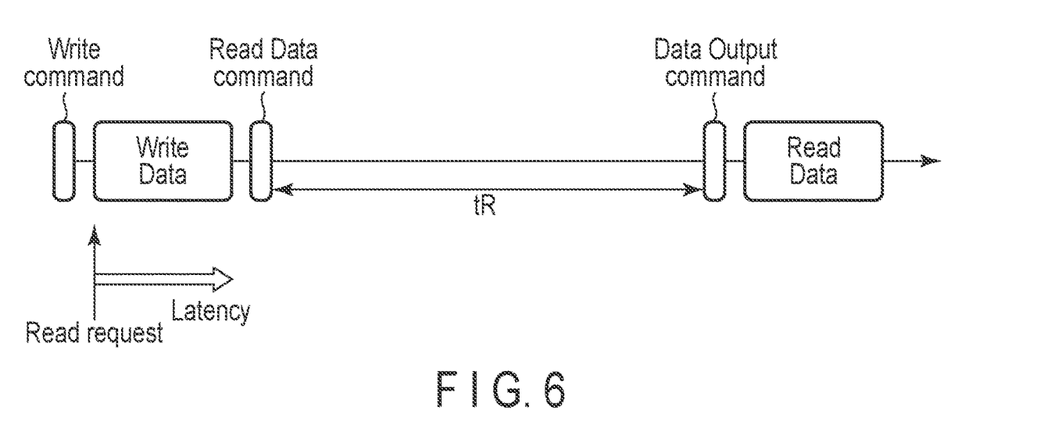
FIG. 6 is a diagram illustrating a difference between a timing of generating a read request and a timing of a read command.

Further, when there is the command transfer disabled period, issuing of the read data command is more delayed, and the performance of the NAND memory 40 is more lowered. FIG. 6 is a diagram for explaining the preparation time tR for outputting the read data and the command transfer disabled period.

FIG. 6 illustrates the state of the I/O signal lines DQ [7:0] when the read operation is executed after the write operation. It is assumed that a read request is issued after the NAND I/F circuit 32 transfers the write command to the NAND chip 42 and before the NAND I/F circuit 32 transfers the write data. Since the period for transferring the write data is the command transfer disabled period, there is a latency for transfer of the read data command. When the transfer of the write data is completed, the NAND I/F circuit 32 transfers the read data command to the NAND chip 42. Then, when the preparation time tR elapses, the NAND I/F circuit 32 transfers the data output command to the NAND chip 42. Then, the read data is transferred from the NAND chip 42 to the NAND I/F circuit 32.

Figure 7:
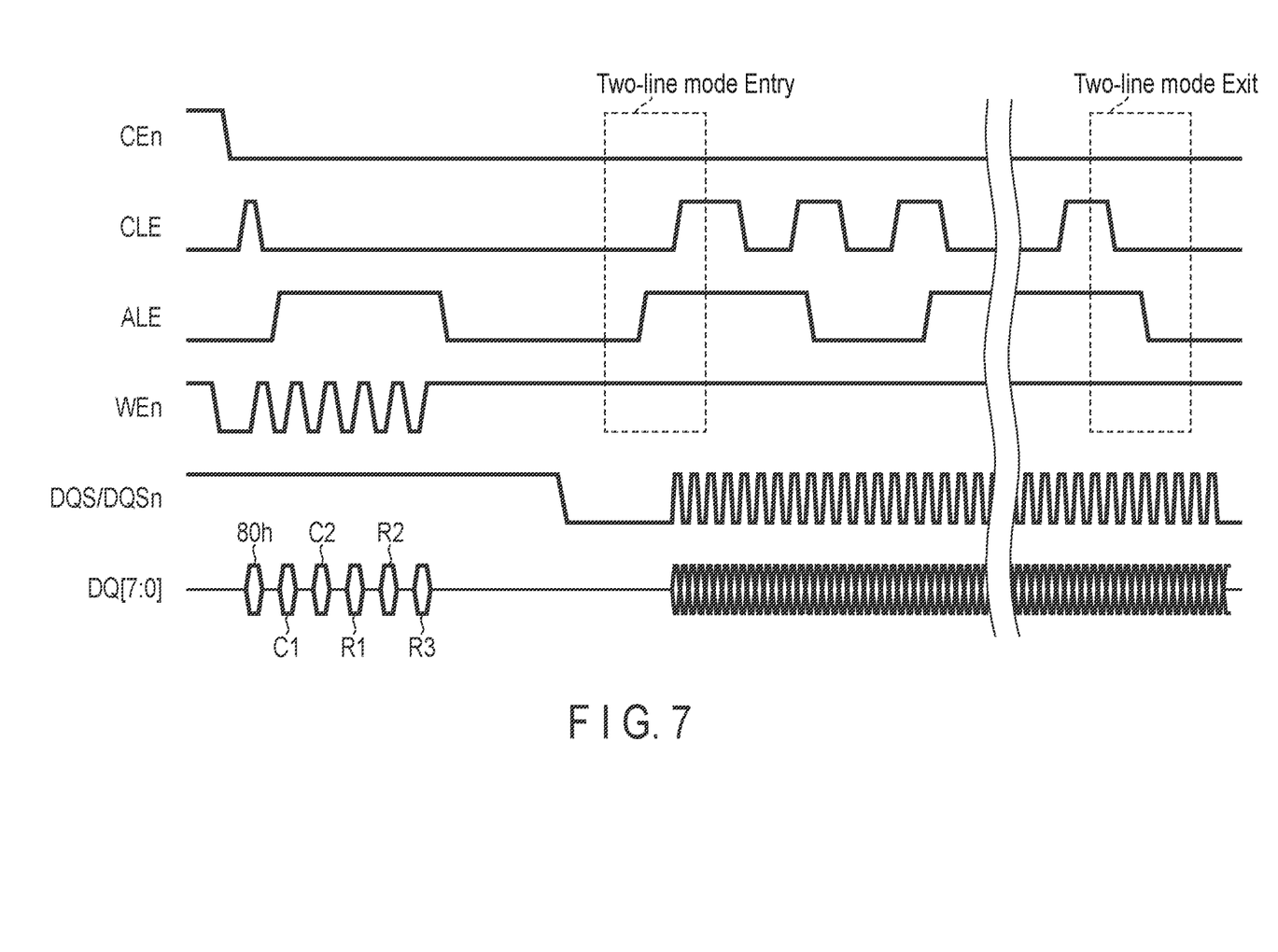
FIG. 7 is a waveform diagram illustrating an example of a toggle interface according to the embodiment.

FIG. 7 is a waveform diagram illustrating an example of the toggle interface according to the embodiment. In the toggle interface according to the embodiment, either a first mode or a second mode may be selected for transfer of a command and an address. According to the first mode, the same operation as a conventional toggle interface is performed. That is, the NAND I/F circuit 32 asserts the command latch enable signal line CLE and transfers a command to the input/output circuit 102 by the I/O signal lines DQ [7:0] in synchronization with the rising edge (deasserting) of the write enable signal line WEn. The NAND I/F circuit 32 asserts the address latch enable signal line ALE and transfers an address to the input/output circuit 102 by the I/O signal lines DQ [7:0] in synchronization with the rising edge (deasserting) of the write enable signal line WEn. According to the second operation mode, a command and an address are transferred by two signal lines which are the command latch enable signal line CLE and the address latch enable signal line ALE.

In the conventional toggle interface, both the command latch enable signal line CLE and the address latch enable signal line ALE are at the low level (deasserted state) during data transfer. Therefore, in the second mode, it is possible to transfer a command and an address during the data transfer by the two signal lines CLE and ALE. The first mode may be referred to as a toggle interface, and the second mode may be referred to as a two-lines interface.

When no operation mode is explicitly selected for transfer of a command and an address, the first mode is performed. Therefore, as illustrated in FIG. 7, the write command is transferred in a similar manner to in a case of the conventional toggle interface illustrated in FIG. 3. In FIG. 7, the command 01h is not illustrated.

The NAND I/F circuit 32 asserts the chip enable signal line CEn and the write enable signal line WEn.

The NAND I/F circuit 32 maintains the asserted state of the data strobe signal line DQS/DQSn.

The NAND I/F circuit 32 asserts the command latch enable signal line CLE and deasserts the write enable signal line WEn. The NAND I/F circuit 32 transfers the command 80h to the NAND chip 42 by the I/O signal lines DQ [7:0] in synchronization with the rising edge (deasserting) of the write enable signal line WEn.

After transferring the command 80h, the NAND I/F circuit 32 deasserts the command latch enable signal line CLE and asserts the address latch enable signal line ALE. The NAND I/F circuit 32 starts periodic asserting/deasserting of the write enable signal line WEn.

The NAND I/F circuit 32 sequentially transfers column addresses C1 and C2 of two cycles and row addresses R1, R2, and R3 of three cycles to the NAND chip 42 by the I/O signal lines DQ [7:0], in synchronization with the rising edge (deasserting) of the write enable signal line WEn.

After transferring the row address R3, the NAND I/F circuit 32 maintains the deasserted state of the write enable signal line WEn to stop the periodic asserting/deasserting of the write enable signal line WEn.

The NAND I/F circuit 32 deasserts the address latch enable signal line ALE.

The NAND I/F circuit 32 deasserts the data strobe signal line DQS/DQSn.

The NAND I/F circuit 32 starts periodic asserting/deasserting of the data strobe signal line DQS/DQSn. The NAND I/F circuit 32 sequentially transfers write data to the NAND chip 42 by the I/O signal lines DQ [7:0] in synchronization with both the rising edge (asserting) and the falling edge (deasserting) of the data strobe signal line DQS/DQSn.

It is assumed that, before or during transfer of write data, the read request is issued for a NAND chip other than a NAND chip 42 to which the write data is transferred or for a NAND chip of another plane of the same chip. In this case, it is not possible to transfer a read data command, a data output command, and an address related to the read request, in the first mode. Thus, the NAND I/F circuit 32 changes the operation mode from the first mode to the second mode (in FIG. 7, referred to as a two-lines mode Entry). The NAND I/F circuit 32 first asserts the address latch enable signal line ALE and then asserts the command latch enable signal line CLE, thereby transferring a notification of the two-lines mode Entry to the NAND chip 42 (peripheral circuit 44). When detecting the two-lines mode Entry in which the address latch enable signal line ALE is first asserted and then the command latch enable signal line CLE is asserted, the peripheral circuit 44 changes the operation mode from the first mode to the second mode.

After switching to the second operation mode is completed, the NAND I/F circuit 32 transfers 1-bit data indicative of a command or an address by the address latch enable signal line ALE at the falling edge (deasserting) of the command latch enable signal line CLE. The logic control circuit 104 of the peripheral circuit 44 in the NAND chip 42 latches data of the address latch enable signal line ALE at the falling edge (deasserting) of the command latch enable signal line CLE, and supplies the latched data to the input/output circuit 102. When operating in the second mode, the input/output circuit 102 considers the data supplied from the logic control circuit 104 as the data input by the I/O signal lines DQ [7:0].

In the second mode, it is required that the NAND I/F circuit 32 changes the level of data to be transferred by the address latch enable signal line ALE (from the low level to the high level and from the high level to the low level) when the command latch enable signal line CLE is at the high level. Therefore, the NAND I/F circuit 32 sets (asserts) the command latch enable signal line CLE to be at the high level, before changing the level of the data to be transferred. As described above, data indicative of the command or the address is serially transferred by the two-lines interface.

The NAND I/F circuit 32 maintains the deasserted state of the write enable signal line WEn even though the operation mode is switched to the second mode.

In the two-lines interface, the command latch enable signal line CLE acts as a clock. The NAND I/F circuit 32 periodically deasserts/asserts the command latch enable signal line CLE based on a clock generated by a built-in oscillator.

When the transfer of the data indicative of the command or the address is completed, the NAND I/F circuit 32 changes the operation mode from the second operation mode to the first operation mode (in FIG. 7, referred to as the two-lines mode Exit). The NAND I/F circuit 32 first deasserts the command latch enable signal line CLE and then deasserts the address latch enable signal line ALE, thereby transferring a notification of the two-lines mode Exit to the NAND chip 42 (peripheral circuit 44). When the last transferred bit is at the low level (address latch enable signal line ALE is in the deasserted state), the NAND I/F circuit 32 asserts the address latch enable signal line ALE once before the two-lines mode Exit, and then deasserts the address latch enable signal line ALE.

When detecting the two-lines mode Exit in which the command latch enable signal line CLE is first deasserted and then the address latch enable signal line ALE is deasserted, the peripheral circuit 44 changes the operation mode from the second mode to the first mode. The timing of the two-lines mode Exit may be during the transfer of the write data. When the two-lines mode Exit occurs during the transfer of the write data, and another read request is issued, the NAND I/F circuit 32 may change the operation mode from the first mode to the second mode again and transfer the command and the address in the second mode.

Figure 8:
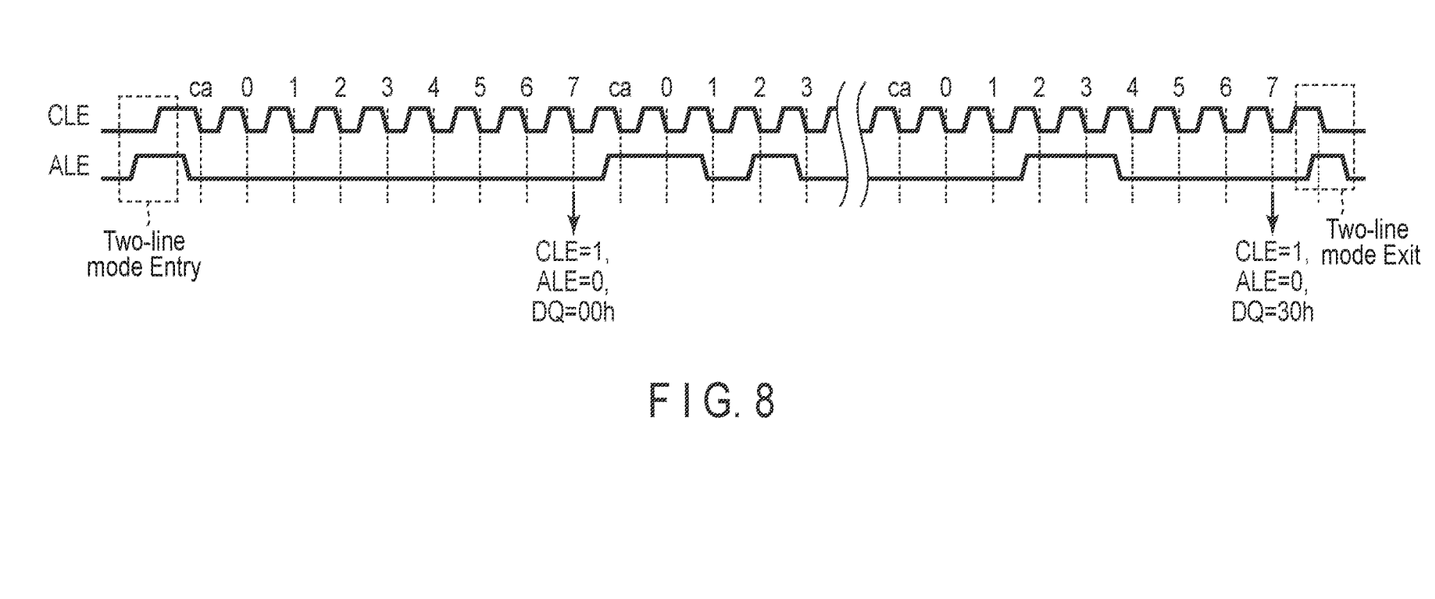
FIG. 8 is a waveform diagram illustrating an example of serial transfer according to the embodiment.

FIG. 8 illustrates an example of serial transfer according to the embodiment. FIG. 8 is a waveform diagram when 1-bit data indicative of the read data command are serially transferred by the two-lines interface.

In the toggle interface, the level of the command latch enable signal line CLE and the level of the address latch enable signal line ALE indicate whether the transferred byte is a command or an address. When the transferred byte is a command, the level of the command latch enable signal line CLE is at the high level. When the transferred byte is an address, the level of the address latch enable signal line ALE is at the high level. There are two combinations of levels of the command latch enable signal line CLE and the address latch enable signal line ALE: (CLE, ALE)=(1, 0) or (CLE, ALE)=(0, 1).

The two-lines interface uses the command latch enable signal line CLE and the address latch enable signal line ALE are used for command or address transfer. Therefore, the level of the command latch enable signal line CLE and the level of the address latch enable signal line ALE cannot indicate whether the transferred byte is a command or an address. In the two-lines interface, it is necessary to transfer an additional determination bit indicative of whether (CLE, ALE)=(1, 0) or (CLE, ALE)=(0, 1). For example, the NAND I/F circuit 32 adds the 1-bit determination bit to the transfer byte. The determination bit may be added before and after the transfer byte or at any position within the transfer byte. In the example in FIG. 8, the NAND I/F circuit 32 adds the determination bit "ca" before the transfer byte. Since the logic control circuit 104 latches the address latch enable signal line ALE at the falling edge of the command latch enable signal line CLE, the falling edge of the command latch enable signal line CLE corresponds to the determination bit "ca". The determination bit "ca"=0 indicates that (CLE, ALE)=(1, 0) and the transfer byte is a command. The determination bit "ca"=1 indicates that (CLE, ALE)=(0, 1), and the transfer byte is an address.

As illustrated in FIG. 4, it is assumed that the read data command is a 7-byte command from the command 00h to the command 30h. In FIG. 8, the command 01h/02h/03h is not illustrated. In order to serially transfer the 7-byte read data command, it is necessary to serially transfer 63 (=(8+1)×7) bits. Since the byte immediately after the two-lines mode Entry is indicative of the command 00h, "ca"=0. From the next byte, an address is transferred. Therefore, "ca"=1. The last byte is indicative of the command 30h. Therefore, "ca"=0.

The transfer speed of the two-lines interface depends on the deasserting/asserting frequency of the command latch enable signal line CLE. When the command latch enable signal line CLE repeats the deasserting/asserting at 100 MHz, the time to transfer one read data command is 630 ns and two-lines mode Entry/Exit time. The two-lines mode Entry/Exit time is sufficiently smaller than 3.96 μs being the data transfer time of one page (command transfer disabled time) in the toggle interface with a data transfer speed of 4.8 Gbps. Thus, during the data transfer, it is possible to perform serial communication of a command and an address by the two-lines interface. In addition, it is possible to improve the performance of the SSD 14.

Figure 9:
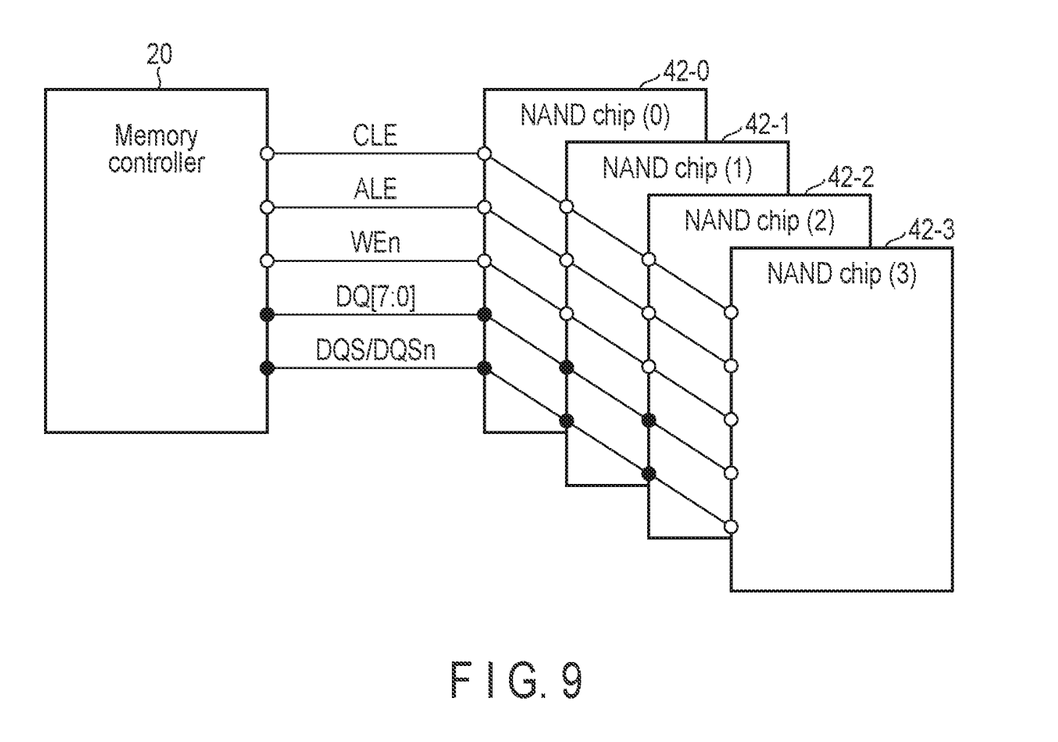
FIG. 9 is a diagram illustrating a state where four NAND chips are stacked and connected to a memory controller.

FIG. 9 illustrates the state in which the four NAND chips 42-0 to 42-3 are connected to the memory controller 20. By the two-lines interface in the embodiment, for example, when write data is transferred to the NAND chip 42-2 by the I/O signal lines DQ [7:0], it is possible to transfer a command and an address to the NAND chip 42-2 or other NAND chips (42-0, 42-1, 42-3) by the command latch enable signal line CLE and the address latch enable signal line ALE which are fixed in the toggle interface. Similarly, when a command and an address are transferred to any NAND chip 42 by the I/O signal lines DQ [7:0], it is possible to transfer data to any NAND chip 42 by the command latch enable signal line CLE and the address latch enable signal line ALE.

As the embodiment, the case where the read request is issued during the transfer of the write data after the write command is issued has been described. The embodiment can be similarly applied to other cases. For example, the embodiment can be applied to a case where another write request is issued during the transfer of write data, a case where the write request is issued during the transfer of read data, and a case where another read request is issued during the transfer of the read data.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    an interface circuit connectable to a first signal line, a second signal line, and a third signal line; and
    a controller configured to transmit a first command, a first address, data, and one of a second command and a second address via the interface circuit, wherein
    before transmitting the data using the first signal line, the controller is configured to transmit the first command using the first signal line while transmitting a first control signal using the second signal line, and transmit the first address using the first signal line while transmitting a second control signal using the third signal line, and
    while transmitting the data using the first signal line, the controller is configured to transmit the second command or the second address using the third signal line based on a signal on the second signal line.

2. The electronic apparatus of claim 1, wherein
    the controller is configured to
    assert the second signal line while the third signal line is asserted, and
    transmit the second command or the second address after asserting the second signal line.

3. The electronic apparatus of claim 2, wherein
    the controller is configured to
    periodically deassert and assert the second signal line after asserting the second signal line, and
    transmit the second command or the second address upon asserting the second signal line or deasserting the second signal line.

4. The electronic apparatus of claim 3, wherein
    the controller is configured to change a level of the third signal line within an assert period of the second signal line while transmitting the second command or the second address.

5. The electronic apparatus of claim 1, wherein
when the third signal line is deasserted before transmitting the second command or the second address, the controller is configured to assert the third signal line, assert the second signal line after asserting the third signal line, and deassert the third signal line after deasserting the second signal line, and
when the third signal line is asserted after transmitting the second command or the second address, the controller is configured to deassert the second signal line, and deassert the third signal line after deasserting the second signal line.

6. The electronic apparatus of claim 1, wherein
the interface circuit is further connectable to a fourth signal line;
before transmitting the data using the first signal line, the controller is further configured to periodically asserting and deasserting the fourth signal line while transmitting the first command and the first address; and
while transmitting the data using the first signal line, the controller is not configured to periodically asserting and deasserting the fourth signal line while transmitting the second command and the second address.

7. A memory system comprising:
a nonvolatile memory;
a first signal line connected to the nonvolatile memory;
a second signal line connected to the nonvolatile memory;
a third signal line connected to the nonvolatile memory; and
a control circuit, wherein
the control circuit comprises:
 an interface circuit connected to the first signal line, the second signal line, and the third signal line; and
 a controller configured to transmit a first command a first address, data, and one of a second command and a second address to the nonvolatile memory via the interface circuit,
before transmitting the data using the first signal line, the controller is configured to transmit the first command using the first signal line while transmitting a first control signal using the second signal line, and transmit the first address using the first signal line while transmitting a second control signal using the third signal line, and
while transmitting the data using the first signal line, the controller is configured to transmit the second command or the second address using the third signal line based on a signal on the second signal line.

8. The memory system of claim 7, wherein
the controller is configured to
 assert the second signal line while the third signal line is asserted, and
 transmit the second command or the second address after asserting the second signal line.

9. The memory system of claim 8, wherein
the controller is configured to
 periodically deassert and assert the second signal line after asserting the second signal line, and
 transmit the second command or the second address upon asserting the second signal line or deasserting the second signal line.

10. The memory system of claim 9, wherein
the controller is configured to change a level of the third signal line within an assert period of the second signal line while transmitting the second command or the second address.

11. The memory system of claim 7, wherein
when the third signal line is deasserted before transmitting the second command or the second address, the controller is configured to assert the third signal line, assert the second signal line after asserting the third signal line, and deassert the third signal line after deasserting the second signal line, and
when the third signal line is asserted after transmitting the second command or the second address, the controller is configured to deassert the second signal line, and deassert the third signal line after deasserting the second signal line.

12. The memory system of claim 7, further comprising:
a fourth signal line connected to the nonvolatile memory, wherein
before transmitting the data using the first signal line, the controller is further configured to periodically asserting and deasserting the fourth signal line while transmitting the first command and the first address; and
while transmitting the data using the first signal line, the controller is not configured to periodically asserting and deasserting the fourth signal line while transmitting the second command and the second address.

13. A transfer method for transferring a first command, a first address, data, and one of a second command and a second address between a nonvolatile memory and a controller, the method comprising:
before transferring the data using a first signal line, transferring the first command using the first signal line while transferring a first control signal using a second signal line, and transferring the first address using the first signal line while transferring a second control signal using a third signal line, and
while transferring the data using the first signal line, transferring the second command or the second address using the third signal line based on a signal on the second signal line.

14. The transfer method of claim 13, further comprising:
asserting the second signal line while the third signal line is asserted, and
transmitting the second command or the second address after asserting the second signal line.

15. The transfer method of claim 14, further comprising:
periodically deasserting and asserting the second signal line after asserting the second signal line, and
transmitting the second command or the second address upon asserting the second signal line or deasserting the second signal line.

16. The transfer method of claim 15, further comprising:
changing a level of the third signal line within an assert period of the second signal line while transmitting the second command or the second address.

17. The transfer method of claim 13, further comprising:
when the third signal line is deasserted before transmitting the second command or the second address, asserting the third signal line, asserting the second signal line after asserting the third signal line, and deasserting the third signal line after deasserting the second signal line, and
when the third signal line is asserted after transmitting the second command or the second address, deasserting the second signal line, and deasserting the third signal line after deasserting the second signal line.

18. The transfer method of claim 13, further comprising:
before transmitting the data using the first signal line, periodically asserting and deasserting a fourth signal line while transmitting the first command and the first address, wherein while transmitting the data using the first signal line, the fourth signal line is not periodically asserted and deasserted while transmitting the second command and the second address.

* * * * *